US012774666B2

(12) United States Patent
Xie et al.

(10) Patent No.: US 12,774,666 B2
(45) Date of Patent: Oct. 27, 2026

(54) MULTISTAGE-COMPRESSION ENERGY STORAGE APPARATUS AND METHOD BASED ON CARBON DIOXIDE GAS-LIQUID PHASE CHANGE

(71) Applicant: EXA ENERGY TECHNOLOGY (SHENZHEN) CO. LTD., Shenzhen (CN)

(72) Inventors: Yonghui Xie, Shenzhen (CN); Qin Wang, Shenzhen (CN); Lei Sun, Shenzhen (CN); Yuqi Wang, Shenzhen (CN); Di Zhang, Shenzhen (CN); Yongliang Guo, Shenzhen (CN); Xiaoyong Wang, Shenzhen (CN); Feng Yang, Shenzhen (CN)

(73) Assignee: EXA ENERGY TECHNOLOGY (SHENZHEN) CO. LTD., Shenzhen (CN)

( * ) Notice: Subject to any disclaimer, the term of this patent is extended or adjusted under 35 U.S.C. 154(b) by 153 days.

(21) Appl. No.: 18/039,760

(22) PCT Filed: Dec. 8, 2021

(86) PCT No.: PCT/CN2021/136504
§ 371 (c)(1),
(2) Date: Jun. 1, 2023

(87) PCT Pub. No.: WO2022/166392
PCT Pub. Date: Aug. 11, 2022

(65) Prior Publication Data

US 2024/0003272 A1 Jan. 4, 2024

(30) Foreign Application Priority Data

Feb. 7, 2021 (CN) ........................ 202110169197.1

(51) Int. Cl.
*F01K 3/12* (2006.01)
*F01K 3/14* (2006.01)
*F01K 25/10* (2006.01)

(52) U.S. Cl.
CPC .................. *F01K 3/12* (2013.01); *F01K 3/14* (2013.01); *F01K 25/103* (2013.01); *Y02E 60/14* (2013.01); *Y02E 60/16* (2013.01)

(58) Field of Classification Search
CPC ..... F01K 3/00; F01K 3/12; F01K 3/14; F01K 3/16; F01K 25/10; F01K 25/103; F01K 7/22; Y02E 60/14; Y02E 60/16
See application file for complete search history.

(56) References Cited

U.S. PATENT DOCUMENTS 4,190,099 A 2/1980 Despois et al.
2017/0058768 A1 * 3/2017 Bergins .................. F25J 1/0045
(Continued)

FOREIGN PATENT DOCUMENTS

CN 103452612 A 12/2013
CN 104533556 A 4/2015
(Continued)

OTHER PUBLICATIONS

International Search Report and Written Opinion from International Application No. PCT/CN2021/136504 mailed Feb. 25, 2022.
(Continued)

*Primary Examiner* — Craig M Schneider
(74) *Attorney, Agent, or Firm* — Ballard Spahr LLP

(57) ABSTRACT

An energy storage apparatus and method based on carbon dioxide gas-liquid phase change. The energy storage apparatus comprises a gas storage reservoir; a liquid storage tank; an energy storage assembly, provided between the gas storage reservoir and the liquid storage tank, wherein the energy storage assembly comprises a condenser and at least
(Continued)

two compression energy storage parts, the compression energy storage parts each comprise a compressor and an energy storage heat exchanger; an energy release assembly, provided between the gas storage reservoir and the liquid storage tank, wherein the energy release assembly comprises an evaporator, an energy release cooler, and at least one expansion energy release part, the expansion energy release part comprises an expander and an energy release heat exchanger; and a heat exchange assembly, comprising a cool storage tank, a heat storage tank, and a heat recovery heat exchanger.

16 Claims, 2 Drawing Sheets

(56) References Cited

U.S. PATENT DOCUMENTS

| | | | | |
|---|---|---|---|---|
| 2018/0171832 | A1 * | 6/2018 | Kubo | F01K 27/00 |
| 2019/0063685 | A1 | 2/2019 | Sinatov | |
| 2020/0182542 | A1 * | 6/2020 | Lin | F02C 6/00 |
| 2022/0145778 | A1 * | 5/2022 | Spadacini | F01K 3/006 |
| 2023/0175418 | A1 * | 6/2023 | Spadacini | F01K 3/18<br>60/671 |
| 2023/0287808 | A1 † | 9/2023 | Conlon | |

FOREIGN PATENT DOCUMENTS

| | | | | | |
|---|---|---|---|---|---|
| CN | 105863751 | A | † | 8/2016 | |
| CN | 107461227 | A | | 12/2017 | |
| CN | 108562081 | A | | 9/2018 | |
| CN | 109826682 | A | | 5/2019 | |
| CN | 110374838 | A | * | 10/2019 | F01D 15/10 |
| CN | 111075671 | A | | 4/2020 | |
| CN | 111648833 | A | * | 9/2020 | F28D 15/02 |
| CN | 111749743 | A | | 10/2020 | |
| CN | 112880451 | A | | 6/2021 | |
| CN | 112985142 | A | | 6/2021 | |
| CN | 112985143 | A | | 6/2021 | |
| CN | 112985144 | A | | 6/2021 | |
| CN | 112985145 | A | | 6/2021 | |
| EP | 2602443 | A1 | * | 6/2013 | |
| JP | 2002081829 | A | | 3/2002 | |
| WO | 9838849 | A1 | | 9/1998 | |
| WO | 2020039416 | A2 | † | 2/2020 | |

OTHER PUBLICATIONS

U.S. Appl. No. 63/117,248 to William Conlon, filed Nov. 23, 2020.†

* cited by examiner
† cited by third party

MULTISTAGE-COMPRESSION ENERGY STORAGE APPARATUS AND METHOD BASED ON CARBON DIOXIDE GAS-LIQUID PHASE CHANGE

CROSS-REFERENCE TO RELATED APPLICATIONS

This application is a U.S. national stage of PCT International Application No. PCT/CN2021/136504 filed on Dec. 8, 2021, which claims priority to Chinese Patent Applications No. 2021101691971, filed on Feb. 7, 2021. The entire contents of each of the above-identified applications are incorporated herein, in their entireties, by this reference.

TECHNICAL FIELD

The present disclosure relates to the field of energy source storage technologies, and in particular, to a multistage-compression energy storage apparatus and method based on carbon dioxide gas-liquid phase change.

BACKGROUND

With the development of social economy, people's demand for energy sources is getting higher and higher. However, the increase in energy source consumption makes environmental problems more serious, and the non-renewable conventional energy sources such as coal and oil are becoming increasingly depleted, so it becomes an inevitable choice to vigorously develop new energy sources such as solar energy and wind energy to slow down consumption of the conventional energy sources. Due to intermittent and fluctuating characteristics of new energy sources, direct grid connection may cause a certain impact on the power grid, and it is difficult to maintain consistency between the time when users use electric energy and the time when renewable energy sources generate electric energy. Therefore, storage of electric energy is of great significance to optimization and regulation of an energy source system.

An energy storage system generally uses a medium or device to store the electric energy and release the electric energy when needed. A multistage-compression energy storage apparatus based on carbon dioxide gas-liquid phase change uses carbon dioxide as an energy storage medium to store the electric energy. A main principle thereof is as follows. During energy storage, the carbon dioxide is compressed by a compressor and then liquefied, and the electric energy is stored in the form of high-pressure carbon dioxide in a liquid state and thermal energy. During energy release, the high-pressure carbon dioxide in the liquid state is released and gasified, and then heated by the thermal energy stored in the compression, enters an expander to apply work, and drives a electric generator to output the electric energy. However, in some current energy storage devices, there is a lot of energy waste during energy storage and release, and energy utilization is relatively low.

SUMMARY

Based on the above, the present disclosure proposes a multistage-compression energy storage apparatus based on carbon dioxide gas-liquid phase change. When energy is stored and released through the apparatus, energy waste during storage and release processes can be reduced and energy utilization can be improved.

A multistage-compression energy storage apparatus based on carbon dioxide gas-liquid phase change, including:

a gas storage reservoir, configured to store carbon dioxide in a gas state, wherein a volume of the gas storage reservoir is changeable;

a liquid storage tank, configured to store carbon dioxide in a liquid state;

an energy storage assembly, configured to store energy and arranged between the gas storage reservoir and the liquid storage tank, wherein the energy storage assembly includes a condenser and at least two compression energy storage parts, the compression energy storage parts each include a compressor and an energy storage heat exchanger, the compressor is configured to compress the carbon dioxide, and the condenser is configured to condense the carbon dioxide;

an energy release assembly, arranged between the gas storage reservoir and the liquid storage tank, wherein the energy release assembly includes an evaporator, an energy release cooler, and at least one expansion energy release part, the expansion energy release part includes an expander and an energy release heat exchanger, the evaporator is configured to evaporate the carbon dioxide, the expander is configured to release energy, and the energy release cooler is configured to cool the carbon dioxide entering the gas storage reservoir; and a heat exchange assembly, wherein the heat exchange assembly includes a cold storage tank, a heat storage tank, and a heat recovery heat exchanger, a heat exchange medium is provided in the cold storage tank and the heat storage tank, the cold storage tank and the heat storage tank form a heat exchange circuit between the energy storage heat exchanger and the energy release heat exchanger, and the heat exchange medium is capable of flowing in the heat exchange circuit;

wherein at least one of the condenser, the energy release cooler, and the heat recovery heat exchanger is connected to the evaporator to provide energy to the evaporator.

In an embodiment, the condenser, the energy release cooler, and the heat recovery heat exchanger are all connected to the evaporator.

In an embodiment, the energy release assembly further includes a throttle expansion valve, the throttle expansion valve is located between the liquid storage tank and the evaporator, and the throttle expansion valve is configured to depressurize the carbon dioxide flowing out of the liquid storage tank.

In an embodiment, the evaporator and the condenser are capable of being combined to form a phase change heat exchanger.

In an embodiment, the energy storage heat exchanger is connected to the compressor in each of the compression energy storage parts, the energy storage heat exchanger in each of the compression energy storage parts is connected to the compressor in an adjacent compression energy storage part, the compressor in the compression energy storage part at the starting end is connected to the gas storage reservoir, the energy storage heat exchanger in the compression energy storage part at the tail end is connected to the condenser, the liquid storage tank is connected to the condenser, and the heat exchange assembly is connected to the energy storage heat exchanger.

In an embodiment, the expander is connected to the energy release heat exchanger in each of the expansion energy release parts, the expander in each of the expansion energy release parts is connected to the energy release heat exchanger in an adjacent expansion energy release part, the evaporator is connected to the liquid storage tank, the energy release heat exchanger in the expansion energy release part at the starting end is connected to the evaporator, the expander in the expansion energy release part at the tail end is connected to the energy release cooler, the gas storage reservoir is connected to the energy release cooler, and the heat exchange assembly is connected to the energy release heat exchanger.

In an embodiment, an auxiliary heating element is arranged between the cold storage tank and the heat storage tank, and part of the heat exchange medium is capable of flowing into the heat storage tank after being heated by the auxiliary heating element.

In an embodiment, the multistage-compression energy storage apparatus based on carbon dioxide gas-liquid phase change further includes an external heat source, wherein the external heat source is connected to the evaporator.

In an embodiment, the multistage-compression energy storage apparatus based on carbon dioxide gas-liquid phase change further includes a heat recovery assembly, wherein at least one of the condenser, the energy release cooler, and the heat recovery heat exchanger is connected to the evaporator through the heat recovery assembly.

In an embodiment, the heat recovery assembly includes an intermediate storage element and recovery pipelines, wherein the intermediate storage element is connected to the evaporator through part of the recovery pipelines, and at least one of the condenser, the energy release cooler, and the heat recovery heat exchanger is capable of reaching the intermediate storage element through part of the recovery pipelines.

In an embodiment, the gas storage reservoir is a flexible pneumatic membrane gas storage reservoir.

According to the multistage-compression energy storage apparatus based on carbon dioxide gas-liquid phase change, energy storage is completed when the carbon dioxide in the gas state in the gas storage reservoir flows to the liquid storage tank through the energy storage assembly, and energy release is completed when the carbon dioxide in the liquid state in the liquid storage tank flows to the gas storage reservoir through the energy release assembly. In the energy storage assembly, when the carbon dioxide is compressed by the compressor, a temperature of the carbon dioxide may be increased, and part of the energy may be converted into thermal energy. When the heat exchange medium flows from the cold storage tank to the heat storage tank, this part of the thermal energy may be absorbed by the energy storage heat exchanger. When the heat exchange medium flows from the heat storage tank to the cold storage tank, this part of the thermal energy is transferred, through the energy release heat exchanger, to the carbon dioxide flowing through the energy release heat exchanger, and then released through the expander. The heat recovery heat exchanger supplies at least one of excess heat temporarily stored in the heat exchange medium, heat released when the energy release cooler cools the carbon dioxide entering the gas storage reservoir, and heat released when the condenser performs condensation to the carbon dioxide in the liquid state for use in evaporation of the evaporator. Therefore, excess energy generated during energy storage and energy release can be recovered for use to reduce the energy waste and improve the energy utilization.

The present disclosure further proposes a multistage-compression energy storage method based on carbon dioxide gas-liquid phase change, which can reduce the energy waste during storage and release processes and improve the energy utilization.

A multistage-compression energy storage method based on carbon dioxide gas-liquid phase change, including an energy storage step and an energy release step, wherein in the energy storage step, carbon dioxide is compressed for multiple times, the carbon dioxide is condensed into a liquid state, and part of energy generated when the carbon dioxide is compressed is temporarily stored by the heat exchange medium;

in the energy release step, after the carbon dioxide is evaporated into a gas state, the energy temporarily stored in the heat exchange medium is released through the carbon dioxide; and at least one of the part of the energy stored in the heat exchange medium, energy generated during the condensation, and energy generated during cooling of the carbon dioxide after energy release is completed, is used in evaporation of the carbon dioxide.

In an embodiment, the energy storage step and the energy release step are performed simultaneously.

According to the multistage-compression energy storage method based on carbon dioxide gas-liquid phase change, at least one of heat released when the carbon dioxide is condensed, part of heat stored in the heat exchange medium but not released in the energy release step, and heat released when the carbon dioxide is cooled down after energy release is completed through the carbon dioxide in the energy release step is used in evaporation of the carbon dioxide. Through energy recovery for use, the energy waste can be reduced and the energy utilization can be improved.

Figure 1:
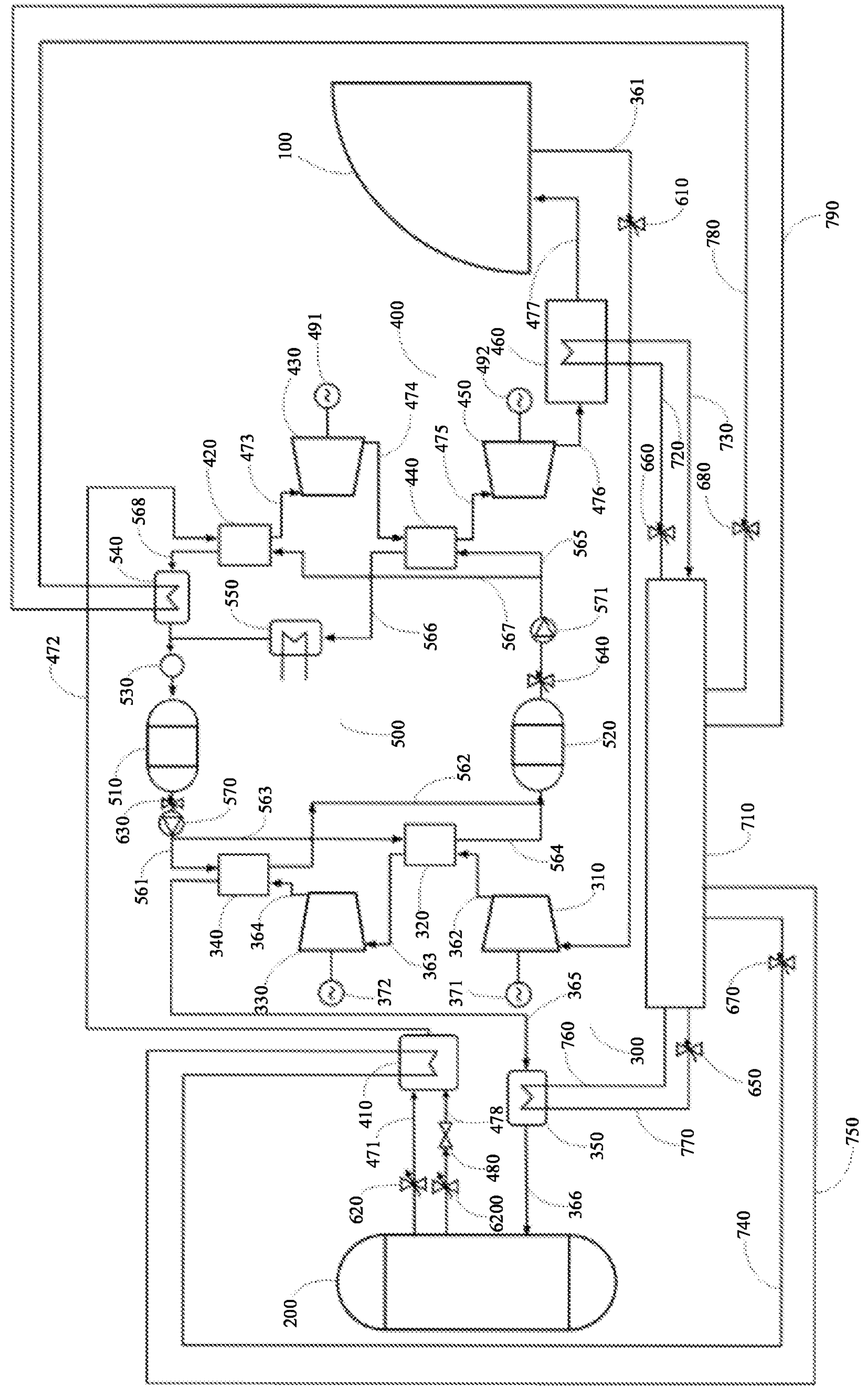
FIG. 1 is a schematic structural diagram of a multistage-compression energy storage apparatus based on carbon dioxide gas-liquid phase change in an embodiment of the present disclosure.

REFERENCE SIGNS gas storage reservoir 100;

liquid storage tank 200;

energy storage assembly 300, first compressor 310, first energy storage heat exchanger 320, second compressor 330, second energy storage heat exchanger 340, condenser 350, first energy storage pipeline 361, second energy storage pipeline 362, third energy storage pipeline 363, fourth energy storage pipeline 364, fifth energy storage pipeline 365, sixth energy storage pipeline 366, first electric motor 371, second electric motor 372;

energy release assembly 400, evaporator 410, first energy release heat exchanger 420, first expander 430, second energy release heat exchanger 440, second expander 450, energy release cooler 460, first energy release pipeline 471, second energy release pipeline 472, third energy release pipeline 473, fourth energy release pipeline 474, fifth energy release pipeline 475, sixth energy release pipeline 476, seventh energy release pipeline 477, eighth energy release pipeline 478, throttle expansion valve 480, first electric generator 491, second electric generator 492;

heat exchange assembly 500, cold storage tank 510, heat storage tank 520, heat exchange medium cooler 530, first heat recovery heat exchanger 540, second heat recovery heat exchanger 550, first heat exchange pipeline 561, second heat exchange pipeline 562, third heat exchange pipeline 563, fourth heat exchange pipeline 564, fifth heat exchange pipeline 565, sixth heat exchange pipeline 566, seventh heat exchange pipeline 567, eighth heat exchange pipeline 568, first heat exchange medium circulation pump 570, second heat exchange medium circulation pump 571;

first valve 610, second valve 620, third valve 630, fourth valve 640, fifth valve 650, sixth valve 660, seventh valve 670, eighth valve 680, ninth valve 690, tenth valve 6200;

pool 710, first recovery pipeline 720, second recovery pipeline 730, third recovery pipeline 740, fourth recovery pipeline 750, fifth recovery pipeline 760, sixth recovery pipeline 770, seventh recovery pipeline 780, eighth recovery pipeline 790;

auxiliary heating element 810, heating pipeline 820.

DETAILED DESCRIPTION OF THE EMBODIMENTS

In order to make the above objectives, features and advantages of the present disclosure more apparent and understandable, specific implementations of the present disclosure are described in detail below with reference to the accompanying drawings. In the following description, numerous specific details are set forth in order to provide a thorough understanding of the present disclosure. However, the present disclosure can be implemented in many other ways different from those described herein, and those skilled in the art can make similar modifications without departing from the concept of the present disclosure. Therefore, the present disclosure is not limited by specific embodiments disclosed below.

In the description of the present disclosure, it should be understood that the orientation or position relationships indicated by the terms "central", "longitudinal", "transverse", "length", "width", "thickness", "up", "down", "front", "back", "left", "right", "vertical", "horizontal", "top", "bottom", "inner", "outer", "clockwise", "counterclockwise", "axial", "radial", "circumferential", etc. are based on the orientation or position relationships shown in the accompanying drawings and are intended to facilitate the description of the present disclosure and simplify the description only, rather than indicating or implying that the apparatus or element referred to must have a particular orientation or be constructed and operated in a particular orientation, and therefore are not to be interpreted as limiting the present disclosure.

In addition, the terms "first" and "second" are used for descriptive purposes only, which cannot be construed as indicating or implying a relative importance or implicitly specifying the number of the indicated technical features. Thus, the features defined with "first" and "second" may explicitly or implicitly include at least one such feature. In the description of the present disclosure, "a plurality of" means at least two, such as two or three, unless specifically stated otherwise.

In the present disclosure, unless otherwise specifically stated and limited, the terms "mounted", "connected with each other", "connected", "fixed", etc. should be understood in a broad sense, for example, it may be a fixed connection, or a detachable connection, or integrated as one; it can be a mechanical connection, or an electrical connection; it can be directly connected, or indirectly connected through an intermediate medium, it can be internal communication between two elements, or an interaction relationship between two elements, unless otherwise expressly defined. For those of ordinary skill in the art, the specific meanings of the foregoing terms in the present disclosure can be understood according to specific situations.

In the present disclosure, unless otherwise explicitly specified and defined, a first feature being "on" or "under" a second feature may be a case that the first feature is in direct contact with the second feature, or the first feature is in indirect contact with the second feature via an intermediate medium. Furthermore, the first feature being "over", "above" and "on" the second feature may be a case that the first feature is directly above or obliquely above the second feature, or only means that the level of the first feature is higher than that of the second feature. The first feature being "below", "beneath" or "under" the second feature may be a case that the first feature is directly below or obliquely below the second feature, or simply means that the level of the first feature is lower than that of the second feature.

It should be noted that when one element is referred to as "fixed to" or "disposed on" another element, it may be directly on the other element or an intermediate element may exist. When one element is considered to be "connected to" another element, it may be directly connected to the other element or an intermediate element may co-exist. The terms "vertical", "horizontal", "up", "down", "left", "right" and similar expressions used herein are for illustrative purposes only, and do not represent unique embodiments.

Referring to FIG. 1, FIG. 1 is a schematic structural diagram of a multistage-compression energy storage apparatus based on carbon dioxide gas-liquid phase change in an embodiment of the present disclosure. The multistage-compression energy storage apparatus based on carbon dioxide gas-liquid phase change in an embodiment of the present disclosure includes components such as a gas storage reservoir 100, a liquid storage tank 200, an energy storage assembly 300, an energy release assembly 400, and a heat exchange assembly 500.

During a trough period of electricity consumption, the multistage-compression energy storage apparatus based on carbon dioxide gas-liquid phase change in this embodiment can change carbon dioxide from a gas state to a liquid state through excess power, and store the energy. During a peak period of electricity consumption, this part of energy is released to drive a electric generator to generate electricity. In this way, not only the energy waste can be reduced, but also the electricity price difference between the trough period and the peak period of electricity consumption can be earned, bringing considerable economic benefits.

The liquid storage tank 200 stores carbon dioxide in the liquid state at high pressure. The gas storage reservoir 100 stores carbon dioxide in the gas state at normal temperature and normal pressure, and the pressure and the temperature inside the gas storage reservoir 100 are maintained within a certain range to meet the energy storage requirements. Specifically, a heat preservation device is provided to maintain the temperature of the gas storage reservoir 100 so that the temperature inside the gas storage reservoir 100 is maintained within a required range. According to an ideal gas state equation PV=nRT, when the temperature and the pressure are constant, the volume is directly propartal to the amount of substance. Therefore, a pneumatic membrane gas storage reservoir with a changeable volume is used as the gas storage reservoir 100. When carbon dioxide is charged, the volume of the gas storage reservoir 100 increases, and when the carbon dioxide flows out, the volume of the gas storage reservoir 100 decreases, so as to realize a constant pressure in the gas storage reservoir 100. It is to be noted that the pressure and the temperature inside the gas storage reservoir 100 are maintained within a certain range, such that they are approximately regarded as constant values in the above analysis.

Specifically, the temperature $T_1$ in the gas storage reservoir 100 is in a range of 15° C.≤$T_1$≤35° C., and a difference between the pressure in the gas storage reservoir 100 and the pressure in the external atmosphere is less than 1000 Pa.

The energy storage assembly 300 is located between the gas storage reservoir 100 and the liquid storage tank 200. The carbon dioxide in the gas state flowing out of the gas storage reservoir 100 is changed into the liquid state through the energy storage assembly 300, and flows into the liquid storage tank 200. During this process, the energy storage is completed.

Specifically, the energy storage assembly 300 includes a condenser 350 and at least two compression energy storage parts. The compression energy storage parts each include a compressor and an energy storage heat exchanger. The energy storage heat exchanger in each of the compression energy storage parts is connected to the compressor in an adjacent compression energy storage part, the compressor in the compression energy storage part at the starting end is connected to the gas storage reservoir 100, and the energy storage heat exchanger in the compression energy storage part at the tail end is connected to the condenser 350. The starting end and the tail end herein are defined by a direction from the gas storage reservoir 100 through the energy storage assembly 300 to the liquid storage tank 200.

The carbon dioxide, when flowing through the compressor, is compressed and pressurized by the compressor. During the compression, heat may be generated, increasing the temperature of the carbon dioxide. When the heat generated by compression flows with the carbon dioxide through the energy storage heat exchanger, the energy is transferred to the heat exchange assembly 500 through the energy storage heat exchanger. The condenser 350 is configured to condense the compressed carbon dioxide and change the carbon dioxide into a liquid state for storage in the liquid storage tank 200. Heat may be released during the condensation. The condenser 350 may be connected to the evaporator 410 to supply the heat released during the condensation to the evaporator 410.

The energy release assembly 400 is also located between the gas storage reservoir 100 and the liquid storage tank 200. The carbon dioxide in the liquid state flowing out of the liquid storage tank 200 is changed into a gas state through the energy release assembly 400 and flows into the gas storage reservoir 100. During this process, the energy stored during the energy storage is released.

Specifically, the energy release assembly 400 includes an evaporator 410, an energy release cooler 460, and at least one expansion energy release part. The expansion energy release part includes an expander and an energy release heat exchanger. The expander in each of the expansion energy release parts is connected to the energy release heat exchanger in an adjacent expansion energy release part, the energy release heat exchanger in the expansion energy release part at the starting end is connected to the evaporator 410, and the expander in the expansion energy release part at the tail end is connected to the energy release cooler 460. The starting end and the tail end herein are defined by a direction from the liquid storage tank 200 through the energy release assembly 400 to the gas storage reservoir 100. If there is only one expansion energy release part, this only one expansion energy release part is both the starting end and the tail end.

The carbon dioxide in the liquid state, when flowing through the evaporator 410, is evaporated and changed into the gas state. Afterwards, when flowing through the energy release heat exchanger, the carbon dioxide in the gas state can absorb the energy temporarily stored in the heat exchange assembly 500 and release the energy through the expander. After the energy release is completed, both the temperature and the pressure of the carbon dioxide decrease, but the temperature thereof is still higher than that required by the gas storage reservoir 100. Therefore, the carbon dioxide is required to be further cooled by the energy release cooler 460, and heat may be released during the cooling. The energy release cooler 460 may be connected to the evaporator 410 to supply the heat released during the cooling to the evaporator 410.

The heat exchange assembly 500 is arranged between the energy storage assembly 300 and the energy release assembly 400. During the energy storage process, a part of the stored energy is stored in a form of pressure energy in the carbon dioxide in the liquid state in the high-pressure state, and the other part of the stored energy is stored in a form of thermal energy in the heat exchange assembly 500. During the energy release process, this part of energy is transferred to the energy release assembly 400 by the heat exchange assembly 500, and all the stored energy is released through the expander.

Specifically, the heat exchange assembly 500 includes components such as a cold storage tank 510, a heat storage tank 520, and a heat recovery heat exchanger. A heat exchange medium is stored in the cold storage tank 510 and the heat storage tank 520. The cold storage tank 510 and the heat storage tank 520 form a heat exchange circuit between the energy storage heat exchanger and the energy release heat exchanger, and the heat exchange medium can circulate in the heat exchange circuit to realize energy transfer. The heat exchange medium may be selected according to specific situations. For example, a substance such as molten salt or saturated water may be selected.

Specifically, the heat exchange circuit includes a first heat exchange circuit section and a second heat exchange circuit section. The energy storage heat exchanger is arranged on the first heat exchange circuit section, and the energy release heat exchanger and the heat recovery heat exchanger are arranged on the second heat exchange circuit section. The heat exchange medium, when flowing from the cold storage tank 510 through the energy storage heat exchanger to the heat storage tank 520, can absorb the heat generated during the energy storage process. When the heat exchange medium flows from the heat storage tank 520 through the energy release heat exchanger to the cold storage tank 510, part of the energy absorbed by the heat exchange medium is released into the carbon dioxide flowing through the energy release heat exchanger, and part of the energy flows to the heat recovery heat exchanger and may be transferred to the evaporator 410 through the heat recovery heat exchanger for use in evaporation.

In the multistage-compression energy storage apparatus based on carbon dioxide gas-liquid phase change in this embodiment, the carbon dioxide only changes between the gas state and the liquid state. Before the energy storage, the carbon dioxide is in the gas state and is at normal temperature and normal pressure. Compared with the conventional energy storage and energy release through supercritical carbon dioxide, the requirements for the gas storage reservoir 100 in this embodiment are lower, and there is no need to set up storage components with complex structures, which can reduce the costs to some extent.

In the multistage-compression energy storage apparatus based on carbon dioxide gas-liquid phase change in this embodiment, during the above energy storage process and energy release process, heat may be generated at each of the condenser 350, the energy release cooler 460, and the heat recovery heat exchanger. At least one of the components is connected to the evaporator 410 to recover the heat for use, so that the heat can be used in the evaporation of the carbon dioxide. In this way, the energy waste during the energy storage process and energy release process can be reduced, energy utilization can be improved, and costs can be reduced.

Further, the condenser 350, the energy release cooler 460, and the heat recovery heat exchanger may be all connected to the evaporator 410 to provide heat for the evaporation.

In some embodiments, the energy storage assembly 300 includes components such as a first compressor 310, a first energy storage heat exchanger 320, a second compressor 330, a second energy storage heat exchanger 340, and a condenser 350. The first compressor 310 is connected to the gas storage reservoir 100 through a first energy storage pipeline 361, the first energy storage heat exchanger 320 is connected to the first compressor 310 through a second energy storage pipeline 362, the second compressor 330 is connected to the first energy storage heat exchanger 320 through a third energy storage pipeline 363, the second energy storage heat exchanger 340 is connected to the second compressor 330 through a fourth energy storage pipeline 364, the condenser 350 is connected to the second energy storage heat exchanger 340 through a fifth energy storage pipeline 365, and the liquid storage tank 200 is connected to the condenser 350 through a sixth energy storage pipeline 366.

The heat exchange assembly 500 is connected to both the first energy storage heat exchanger 320 and the second energy storage heat exchanger 340. Part of energy generated when the first compressor 310 and the second compressor 330 compress carbon dioxide is stored in the form of pressure energy in high-pressure carbon dioxide, and part of the energy is transferred, through the first energy storage heat exchanger 320 and the second energy storage heat exchanger 340, in the form of thermal energy to the heat exchange medium for temporary storage.

In the above structure, two-stage compression is provided, and the carbon dioxide is gradually pressurized through the two-stage compression. Compared with one-stage compression, compressors with a smaller compression ratio may be selected for two-stage compression, and the cost of the compressor is lower. Certainly, the number of the compressors may also be more than two, as long as the compressor and the energy storage heat exchanger are added as a set.

The energy release assembly 400 includes components such as an evaporator 410, a first energy release heat exchanger 420, a first expander 430, a second energy release heat exchanger 440, a second expander 450, and an energy release cooler 460. The evaporator 410 is connected to the liquid storage tank 200 through a first energy release pipeline 471, the first energy release heat exchanger 420 is connected to the evaporator 410 through a second energy release pipeline 472, the first expander 430 is connected to the first energy release heat exchanger 420 through a third energy release pipeline 473, the second energy release heat exchanger 440 is connected to the first expander 430 through a fourth energy release pipeline 474, the second expander 450 is connected to the second energy release heat exchanger 440 through a fifth energy release pipeline 475, the energy release cooler 460 is connected to the second expander 450 through a sixth energy release pipeline 476, and the gas storage reservoir 100 is connected to the energy release cooler 460 through a seventh energy release pipeline 477.

The heat exchange assembly 500 is connected to both the first energy release heat exchanger 420 and the second energy release heat exchanger 440. During the energy release process, the energy temporarily stored in the heat exchange assembly 500 is transferred, through the first energy release heat exchanger 420 and the second energy release heat exchanger 440, into the carbon dioxide flowing through the first energy release heat exchanger 420 and the second energy release heat exchanger 440, the carbon dioxide absorbs this part of energy, and the energy is released through the first expander 430 and the second expander 450.

In the energy release assembly 400, the energy is released through the first expander 430 and the second expander 450 to drive the electric generator to generate electricity. The carbon dioxide in the gas state, when flowing through the first expander 430 and the second expander 450, impacts blades and drives a rotor to rotate to realize energy output.

In the above structure, two expanders are provided to perform the energy release for twice. When two expanders are provided to release energy together, manufacturing requirements for blades of the expanders are lower, and the cost is correspondingly lower. Certainly, the number of the expanders may also be one or more than two, as long as the expander and the energy release heat exchanger are added or reduced as a set.

The heat exchange assembly 500 includes components such as a cold storage tank 510, a heat storage tank 520, a heat exchange medium cooler 530, a first heat recovery heat exchanger 540, and a second heat recovery heat exchanger 550. A temperature of the heat exchange medium in the cold storage tank 510 is lower, while a temperature of the heat exchange medium in the heat storage tank 520 is higher. When the heat exchange medium flows between the cold storage tank 510 and the heat storage tank 520, heat can be collected and released.

The heat exchange medium, when flowing from the cold storage tank 510 to the heat storage tank 520, absorbs part of the heat during the energy storage process. The heat exchange medium, when flowing from the heat storage tank 520 to the cold storage tank 510, releases the previously absorbed heat. The heat exchange medium, when flowing from the heat storage tank 520 to the cold storage tank 510, is cooled by flowing through the heat exchange medium cooler 530 to meet a temperature requirement of the heat exchange medium stored in the cold storage tank 510.

In addition, components such as circulation pumps are arranged on each of the above pipelines to realize directional flow of the carbon dioxide and the heat exchange medium.

During the energy storage process, a first valve 610 and a third valve 630 are turned on, and a second valve 620 and a fourth valve 640 are turned off. The carbon dioxide in the gas state at normal temperature and normal pressure flows out of the gas storage reservoir 100 and flows through the first energy storage pipeline 361 to the first compressor 310, and excess power outputted by a power grid drives, through a first electric motor 371, the first compressor 310 to operate.

The carbon dioxide in the gas state is compressed and pressurized for the first time by the first compressor 310. During the compression, heat is generated, increasing the temperature of the carbon dioxide. The carbon dioxide, after being compressed by the first compressor 310, flows to the first energy storage heat exchanger 320 through the second energy storage pipeline 362, and heat generated during the compression is transferred to the first energy storage heat exchanger 320. The first energy storage heat exchanger 320 transfers the heat to the heat exchange medium. The carbon dioxide flowing out of the first energy storage heat exchanger 320 flows to the second compressor 330 through the third energy storage pipeline 363. The excess power outputted by the power grid drives, through a second electric motor 372, the second compressor 330 to operate, and the second compressor 330 compresses the carbon dioxide for the second time to further increase the pressure thereof. During the compression, heat is generated, increasing the temperature of the carbon dioxide. The carbon dioxide, after being compressed by the second compressor 330, flows to the second energy storage heat exchanger 340 through the fourth energy storage pipeline 364, and heat generated during the compression is transferred to the second energy storage heat exchanger 340. The second energy storage heat exchanger 340 transfers the heat to the heat exchange medium. After the heat exchange is realized, the high-pressure carbon dioxide in the gas state flows to the condenser 350 through the fifth energy storage pipeline 365, and is condensed and changed into carbon dioxide in the liquid state by the condenser 350. The carbon dioxide in the liquid state flows into the liquid storage tank 200 through the sixth energy storage pipeline 366 to complete the energy storage process.

In the above process, the first compressor 310 and the second compressor 330 are driven to operate by the excess power outputted by the power grid, to realize energy input. After the carbon dioxide is compressed twice by the first compressor 310 and the second compressor 330, part of inputted electric energy is stored in the form of pressure energy in the high-pressure carbon dioxide and enters the liquid storage tank 200, and part of the electric energy is stored in the form of thermal energy in the heat exchange medium. That is, during the energy storage process, the inputted electric energy is stored in the form of pressure energy and thermal energy.

During the energy release process, the second valve 620 and the fourth valve 640 are turned on, and the first valve 610 and the third valve 630 are turned off. High-pressure carbon dioxide in the liquid state flows out of the liquid storage tank 200, flows to the evaporator 410 through the first energy release pipeline 471, and is evaporated and changed into the gas state by the evaporator 410. The carbon dioxide in the gas state flows to the first energy release heat exchanger 420 through the second energy release pipeline 472. During the energy storage process, part of the heat stored in the heat exchange medium is transferred, through the first energy release heat exchanger 420, to the carbon dioxide flowing through the first energy release heat exchanger 420, and the carbon dioxide absorbs this part of heat, increasing the temperature of the carbon dioxide. The high-temperature carbon dioxide in the gas state flows to the first expander 430 through the third energy release pipeline 473, and expands in the first expander 430 and applies work externally to realizes energy output, driving a first electric generator 491 to generate electricity. The carbon dioxide, after flowing out of the first expander 430, flows to the second energy release heat exchanger 440 through the fourth energy release pipeline 474. During the energy storage process, part of the heat stored in the heat exchange medium is transferred, through the second energy release heat exchanger 440, to the carbon dioxide flowing through the second energy release heat exchanger 440, and the carbon dioxide absorbs this part of heat, increasing the temperature of the carbon dioxide. The high-temperature carbon dioxide in the gas state flows to the second expander 450 through the fifth energy release pipeline 475, and expands in the second expander 450 and does work externally to realize energy output, driving a second electric generator 492 to generate electricity.

After the energy release, both the pressure and the temperature of the carbon dioxide decrease, but the temperature thereof is still higher than a storage temperature required by the gas storage reservoir 100. Therefore, the carbon dioxide flowing out of the second expander 450 flows into the energy release cooler 460 through the sixth energy release pipeline 476, and the temperature of the carbon dioxide is decreased by the energy release cooler 460 to make the temperature of the carbon dioxide can meet the requirement of the gas storage reservoir 100. The temperature-decreased carbon dioxide flows through the seventh energy release pipeline 477 and enters the gas storage reservoir 100 to complete the entire energy release process.

In the above process, the thermal energy stored in the heat exchange medium flows into the carbon dioxide, and the carbon dioxide expands in the first expander 430 and the second expander 450 to release the pressure energy and the thermal energy together, and convert them into mechanical energy.

During the above energy storage and energy release processes, the first heat exchange medium circulation pump 570 is turned on during the energy storage process, the second heat exchange medium circulation pump 571 is turned on during the energy release process, and the heat exchange medium circulates between the cold storage tank 510 and the heat storage tank 520 to realize temporary storage and release of the energy. Specifically, the energy is temporarily stored in the form of heat in the heat exchange medium. During the energy storage process, after the low-temperature heat exchange medium flows out of the cold storage tank 510, a part of the low-temperature heat exchange medium flows into a first heat exchange pipeline 561, and a part of the low-temperature heat exchange medium flows into a third heat exchange pipeline 563. The heat exchange medium in the first heat exchange pipeline 561 flows to the second energy storage heat exchanger 340 for heat exchange, absorbs the heat in the carbon dioxide compressed for the second time to increase the temperature of this part of the heat exchange medium, and flows into the heat storage tank 520 through a second heat exchange pipeline 562. The heat is temporarily stored in the heat storage tank 520. The heat exchange medium in the third heat exchange pipeline 563 flows to the first energy storage heat exchanger 320 for heat exchange, absorbs the heat in the carbon dioxide compressed for the first time to increase the temperature of this part of the heat exchange medium, and flows into the heat storage tank 520 through the fourth heat exchange pipeline 564. The heat is temporarily stored in the heat storage tank 520.

During the energy release process, after the high-temperature heat exchange medium flows out of the heat storage tank 520, a part of the high-temperature heat exchange medium flows into a fifth heat exchange pipeline 565, and a part of the high-temperature heat exchange medium flows into a seventh heat exchange pipeline 567. The heat exchange medium in the fifth heat exchange pipeline 565 flows to the second energy release heat exchanger 440 for heat exchange, and transfers the heat to the carbon dioxide flowing through the second energy release heat exchanger 440 to increase the temperature of the carbon dioxide. After the heat exchange is completed, the temperature of the heat exchange medium decreases, the temperature-decreased heat exchange medium flows through a sixth heat exchange pipeline 566 to the second heat recovery heat exchanger 550, and the remaining heat is transferred through the second heat recovery heat exchanger 550 to the evaporator 410 for use in the evaporation. Although the temperature of the heat exchange medium are decreased through two heat exchanges, the temperature thereof is still higher than the temperature range required by the cold storage tank 510. Therefore, this part of the heat exchange medium, when flowing through the heat exchange medium cooler 530, is decreased in temperature again by the heat exchange medium cooler 530 to make the temperature thereof meets the requirement of the cold storage tank 510.

The heat exchange medium in the seventh heat exchange pipeline 567 flows to the first energy release heat exchanger 420 for heat exchange, and transfers the heat to the carbon dioxide flowing through the first energy release heat exchanger 420 to increase the temperature of the carbon dioxide. After the heat exchange is completed, the temperature of the heat exchange medium is decreased, the temperature-decreased heat exchange medium flows through an eighth heat exchange pipeline 568 to the first heat recovery heat exchanger 540, and the remaining heat is transferred through the first heat recovery heat exchanger 540 to the evaporator 410 for use in the evaporation. Although the temperature of the heat exchange medium is decreased through two heat exchanges, the temperature thereof is still higher than the temperature range required by the cold storage tank 510. Therefore, this part of the heat exchange medium, when flowing through the heat exchange medium cooler 530, is decreased in temperature again by the heat exchange medium cooler 530 to make the temperature thereof meets the requirement of the cold storage tank 510.

In addition, in some embodiments, the first valve 610, the second valve 620, the third valve 630, and the fourth valve 640 may all be turned on, and the energy storage and the energy release may be performed simultaneously. When the trough period of electricity consumption is about to end and the peak period of electricity consumption is approaching, the above situation may exist. The carbon dioxide in the gas state at normal temperature and normal pressure flows out of the gas storage reservoir 100 and flows through the first energy storage pipeline 361 to the first compressor 310, and power of the power grid may drive, through the first electric motor 371, the first compressor 310 to operate. The carbon dioxide in the gas state is compressed for the first time by the first compressor 310 to pressurize the carbon dioxide. During the compression, heat is generated, increasing the temperature of the carbon dioxide. The carbon dioxide, after being compressed by the first compressor 310, flows to the first energy storage heat exchanger 320 through the second energy storage pipeline 362, and heat generated during the compression is transferred to the first energy storage heat exchanger 320. The first energy storage heat exchanger 320 transfers the heat to the heat exchange medium. The carbon dioxide flowing out of the first energy storage heat exchanger 320 flows to the second compressor 330 through the third energy storage pipeline 363. The power drives, through the second electric motor 372, the second compressor 330 to operate, and the second compressor 330 compresses the carbon dioxide for the second time to further pressurize the carbon dioxide. During the compression, heat is generated, increasing the temperature of the carbon dioxide. The carbon dioxide, after being compressed by the second compressor 330, flows to the second energy storage heat exchanger 340 through the fourth energy storage pipeline 364, and heat generated during the compression is transferred to the second energy storage heat exchanger 340. The second energy storage heat exchanger 340 transfers the heat to the heat exchange medium. After the heat exchange is realized, the high-pressure carbon dioxide in the gas state flows to the condenser 350 through the fifth energy storage pipeline 365, and is condensed and changed into carbon dioxide in the liquid state by the condenser 350. The carbon dioxide in the liquid state flows into the liquid storage tank 200 through the sixth energy storage pipeline 366 to complete the energy storage process. At the same time, the high-pressure carbon dioxide in the liquid state flows out of the liquid storage tank 200, and flows to the evaporator 410 through the first energy release pipeline 471, is evaporated and changed into the gas state by the evaporator 410. The carbon dioxide in the gas state flows to the first energy release heat exchanger 420 through the second energy release pipeline 472. During the energy storage process, part of the heat stored in the heat exchange medium is transferred, through the first energy release heat exchanger 420, to the carbon dioxide flowing through the first energy release heat exchanger 420, and the carbon dioxide absorbs this part of heat, increasing the temperature of the carbon dioxide. The high-temperature carbon dioxide in the gas state flows to the first expander 430 through the third energy release pipeline 473, expands in the first expander 430 and does work externally to realize energy output, driving the first electric generator 491 to generate electricity. The carbon dioxide, after flowing out of the first expander 430, flows to the second energy release heat exchanger 440 through the fourth energy release pipeline 474. During the energy storage process, part of the heat stored in the heat exchange medium is transferred, through the second energy release heat exchanger 440, to the carbon dioxide flowing through the second energy release heat exchanger 440, and the carbon dioxide absorbs this part of heat, increasing the temperature of the carbon dioxide. The high-temperature carbon dioxide in the gas state flows to the second expander 450 through the fifth energy release pipeline 475, expands in the second expander 450 and does work externally to realize energy output, driving the second electric generator 492 to generate electricity. In this process, a rotational speed of a power generation turbine is controllable, which can stabilize an output frequency of power generation and is conducive to frequency regulation of the power grid.

As described above, the condenser 350, the energy release cooler 460, the first heat recovery heat exchanger 540, and the second heat recovery heat exchanger 550 are all connected to the evaporator 410, and all the heat generated by these components is transferred to the evaporator 410 for use in the evaporation, so as to reduce the energy waste and improve the energy utilization.

It is to be noted that the energy release cooler 460, the first heat recovery heat exchanger 540, and the second heat recovery heat exchanger 550 may be connected to the evaporator 410 either directly or indirectly through another component. When energy release and energy storage are performed simultaneously, the condenser 350 is connected to the evaporator 410 either directly or indirectly through another component. If energy release and energy storage are not performed simultaneously, there is a need to first collect the heat released by the condenser 350, and then supply the heat to the evaporator 410 during the energy release.

Preferably, in some embodiments, the first energy release pipeline 471 and an eighth energy release pipeline 478 are arranged between the evaporator 410 and the liquid storage tank 200. The first energy release pipeline 471 is provided with a second valve 620, and the eighth energy release pipeline 478 is provided with a throttle expansion valve 480 and a tenth valve 6200. When the second valve 620 is turned on and the tenth valve 6200 is turned off, the first energy release pipeline 471 is passable. When the tenth valve 6200 is turned on and the second valve 620 is turned off, the eighth energy release pipeline 478 is passable. During the energy release process, if the eighth energy release pipeline 478 is chosen to be passable, the high-pressure carbon dioxide in the liquid state flowing out of the liquid storage tank 200 is expanded and depressurized through the throttle expansion valve 480, and then flows into the evaporator 410.

Compared with changing the carbon dioxide from the liquid state to the gas state only by increasing the temperature, the arrangement of the throttle expansion valve 480 for depressurization is beneficial for the change of the carbon dioxide from the liquid state to the gas state.

Preferably, when the throttle expansion valve 480 is used, the evaporator 410 may be combined with the condenser 350, and the two may be combined into one component to form a phase change heat exchanger. The phase change heat exchanger includes two parts, i.e., an evaporation part and a condensation part. The evaporation part and the condensation part are connected through a pipeline. In the phase change heat exchanger, heat released by the condensation part during condensation is transferred to the evaporation part. After combining the evaporator 410 and the condenser 350 into one component, the heat transfer is completed inside the phase change heat exchanger, which can reduce the loss during the heat transfer and further improve the energy utilization. It is to be noted that the heat transfer can be realized in the above manner only when the energy storage and the energy release are performed simultaneously. If the energy storage and the energy release cannot be operated simultaneously, the energy needs to be stored first and then supplied to the evaporator 410 during evaporation.

In some embodiments, a heat recovery assembly is further provided, and at least one of the condenser 350, the energy release cooler 460, the first heat recovery heat exchanger 540, and the second heat recovery heat exchanger 550 is connected to the evaporator 410 through the heat recovery assembly.

Specifically, the heat recovery assembly may include only a recovery pipeline, and at least one of the condenser 350, the energy release cooler 460, the first heat recovery heat exchanger 540, and the second heat recovery heat exchanger 550 is connected to the evaporator 410 through the recovery pipeline. It is to be noted that a plurality of recovery pipelines may be provided. When the heat of two or three of the condenser 350, the energy release cooler 460, the first heat recovery heat exchanger 540, and the second heat recovery heat exchanger 550 is recovered, the condenser 350, the energy release cooler 460, the first heat recovery heat exchanger 540, and the second heat recovery heat exchanger 550 are respectively connected to the evaporator 410 through a part of the recovery pipelines.

Alternatively, the heat recovery assembly may include recovery pipelines and an intermediate storage element, the evaporator 410 and the intermediate storage element are connected through a part of the recovery pipelines, and at least one of the condenser 350, the energy release cooler 460, the first heat recovery heat exchanger 540, and the second heat recovery heat exchanger 550 is connected to the intermediate storage element through a part of the recovery pipelines.

Specifically, the pool 710 may be selected as the intermediate storage element, and a first recovery pipeline 720 and a second recovery pipeline 730 are arranged between the pool 710 and the energy release cooler 460. A third recovery pipeline 740 and a fourth recovery pipeline 750 are arranged between the pool 710 and the evaporator 410. A fifth recovery pipeline 760 and a sixth recovery pipeline 770 are arranged between the pool 710 and the condenser 350. A seventh recovery pipeline 780 and an eighth recovery pipeline 790 are arranged between the pool 710 and the first heat recovery heat exchanger 540. The pool 710 and the above pipelines are provided with heat preservation materials for heat preservation of water therein.

If energy storage and energy release are performed simultaneously, the fifth valve 650, the sixth valve 660, the seventh valve 670, and the eighth valve 680 are turned on at the same time. Part of the water in the pool 710 flows to the energy release cooler 460 through the first recovery pipeline 720 to absorb the heat released by the energy release cooler 460, and then flows into the pool 710 through the second recovery pipeline 730 after the temperature of the water has increased. At the same time, part of the water in the pool 710 flows to the condenser 350 through the fifth recovery pipeline 760 to absorb the heat released by the condenser 350, and then flows into the pool 710 through the sixth recovery pipeline 770 after the temperature of the water has increased. At the same time, part of the water in the pool 710 flows through the seventh recovery pipeline 780 to the first heat recovery heat exchanger 540 to absorb the heat released by the first heat recovery heat exchanger 540, and then flows into the pool 710 through the eighth recovery pipeline 790 after the temperature of the water has increased. The water with a higher temperature in the pool 710 flows to the evaporator 410 through the third recovery pipeline 740 to provide heat for the evaporation of the carbon dioxide. After flowing through the evaporator 410, the temperature of the water is decreased, and the temperature-decreased water flows into the pool 710 through the fourth recovery pipeline 750.

In the above process, in addition to using the water for heat collection, other substances may also be used.

The first heat recovery heat exchanger 540 and the second heat recovery heat exchanger 550 have a same connection structure with the pool 710 and a same heat transfer method, so details of the connection structure of the second heat recovery heat exchanger 550 and the pool 710 is not described herein again.

In addition, components such as circulation pumps are also arranged on each of the above pipelines to realize the circulating flow of the water in the pool 710.

When the heat released by the energy release cooler 460 and the condenser 350 is continuously transferred to the pool 710, the temperature of the water in the pool 710 may be increased continuously. When the evaporator 410 continuously absorbs the heat in the pool 710, the temperature of the water in the pool 710 may be decreased continuously. Therefore, preferably, the pool 710 is in a constant temperature state.

Specifically, the pool 710 is further connected with components such as a thermostatic controller, a temperature sensor, a heater, and a radiator. The temperature of the water in the pool 710 is monitored through the temperature sensor, and the temperature of the water is transmitted to the thermostatic controller. If the temperature of the water is raised by the heat released by the condenser 350, the energy release cooler 460, the first heat recovery heat exchanger 540, and the second heat recovery heat exchanger 550 for too much and exceed a maximum set value, the thermostatic controller controls the radiator to dissipate heat from the pool 710. If the temperature of the water is reduced by the heat absorbed by the evaporator 410 for too much and is below a minimum set value, the thermostatic controller controls the heater to heat the pool 710.

If the heat in the above four places is still insufficient after being supplied to the evaporator 410, an external heat source may be used to supplement the heat.

Figure 2:
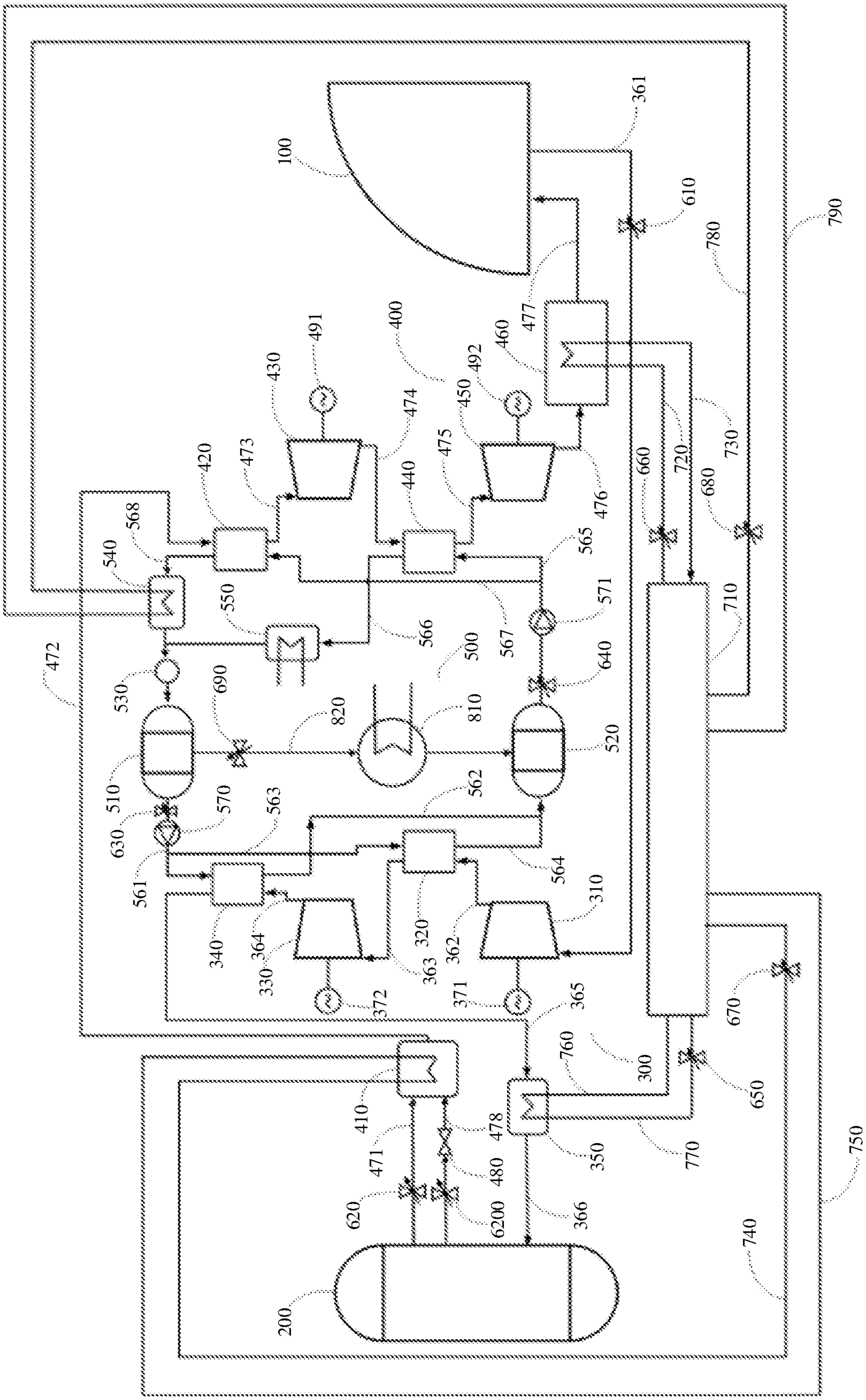
FIG. 2 is a schematic structural diagram of the multistage-compression energy storage apparatus based on carbon dioxide gas-liquid phase change according to another embodiment of the present disclosure.

Refer to FIG. 2 which is a schematic structural diagram of the multistage-compression energy storage apparatus based on carbon dioxide gas-liquid phase change in another embodiment of the present disclosure. If the heat is supplement ed to the heat exchange medium of the heat exchange circuit, a heating pipeline 820 may be arranged between the cold storage tank 510 and the heat storage tank 520, and an auxiliary heating element 810 may be arranged on the heating pipeline 820. When the ninth valve 690 is turned on, part of the heat exchange medium flowing out of the cold storage tank 510 flows to the auxiliary heating element 810 through the heating pipeline 820, and the auxiliary heating element 810 heats this part of the heat exchange medium to make it absorb external heat, so that the heat reaching the first heat recovery heat exchanger 540 and the second heat recovery heat exchanger 550 can be increased. That is, the heat that can be provided to the evaporator 410 is increased.

Preferably, the source of the heat at the auxiliary heating element 810 may be some waste heat, for example, heat released when castings or forgings of the casting factory or the forging factory are cooled. The use of the waste heat as an external heat source can reduce the energy waste and eliminate the need for additional heating, which can reduce costs.

Alternatively, in some embodiments, the external heat source may also be directly connected to the evaporator 410 to directly supply heat to the evaporator 410.

Preferably, a plurality of groups of the energy storage assembly 300, the energy release assembly 400, and the heat exchange assembly 500 may be arranged between the gas storage reservoir 100 and the liquid storage tank 200, and each group is arranged in the manner in the foregoing embodiment. In use, if a component in one of the groups fails, other groups can still operate, such that the failure rate of the device can be reduced and its operating reliability can be improved.

In addition, in some embodiments, a multistage-compression energy storage method based on carbon dioxide gas-liquid phase change is further provided. During energy storage, carbon dioxide is pressurized after multiple compressions, the pressurized carbon dioxide is condensed and changed into the liquid state, and part of energy generated during the compressions is temporarily stored through a heat exchange medium. During energy release, the carbon dioxide is evaporated and changed into the gas state, and the energy temporarily stored in the heat exchange medium during the energy storage is released through the carbon dioxide. At least one of energy generated during the condensation, energy generated when the carbon dioxide after energy release is cooled, and the part of the energy stored in the heat exchange medium can be recovered for use, and this part of the energy can be used in the evaporation of the carbon dioxide. Therefore, energy waste during the energy storage and energy release processes can be reduced, and energy utilization can be improved.

The technical features in the above embodiments may be combined arbitrarily. For concise description, not all possible combinations of the technical features in the above embodiments are described. However, all the combinations of the technical features are to be considered as falling within the scope described in this specification provided that they do not conflict with each other.

The above embodiments only describe several implementations of the present disclosure, and their description is specific and detailed, but cannot therefore be understood as a limitation on the patent scope of the present disclosure. It should be noted that those of ordinary skill in the art may further make variations and improvements without departing from the conception of the present disclosure, and these all fall within the protection scope of the present disclosure. Therefore, the patent protection scope of the present disclosure should be subject to the appended claims.

What is claimed is:

1. A multistage-compression energy storage apparatus based on carbon dioxide gas-liquid phase change, the multistage-compression energy storage apparatus comprising:

a gas storage reservoir, configured to store carbon dioxide in a gas state, wherein a volume of the gas storage reservoir is changeable;

a liquid storage tank, configured to store carbon dioxide in a liquid state;

an energy storage assembly, configured to store energy and arranged between the gas storage reservoir and the liquid storage tank, wherein the energy storage assembly comprises a condenser and at least two compression energy storage parts, the compression energy storage parts each comprise a compressor and an energy storage heat exchanger, each compressor is configured to compress the carbon dioxide, and the condenser is configured to condense the carbon dioxide;

an energy release assembly, arranged between the gas storage reservoir and the liquid storage tank, wherein the energy release assembly comprises an evaporator, an energy release cooler, and at least one expansion energy release part, each of the at least one expansion energy release part comprises an expander and an energy release heat exchanger, the evaporator is configured to evaporate the carbon dioxide, each expander is configured to release energy, and the energy release cooler is configured to cool the carbon dioxide entering the gas storage reservoir; and a heat exchange assembly, wherein the heat exchange assembly comprises a cold storage tank, a heat storage tank, and a heat recovery heat exchanger arranged between the energy release heat exchanger and the cold storage tank, a heat exchange medium is provided in the cold storage tank and the heat storage tank, the cold storage tank and the heat storage tank form a heat exchange circuit between the energy storage heat exchanger in each of the compression energy storage parts and the energy release heat exchanger in each of the at least one expansion energy release part, the heat exchange medium is capable of flowing in the heat exchange circuit, when the heat exchange medium flows from the heat storage tank through the energy release heat exchanger to the cold storage tank, part of energy absorbed by the heat exchange medium is released into the carbon dioxide flowing through the energy release heat exchanger, and part of the energy flows to the heat recovery heat exchanger;

wherein the multistage-compression energy storage apparatus further comprises an intermediate storage element and recovery pipelines, wherein the intermediate storage element is connected to the evaporator through part of the recovery pipelines, and the condenser, the energy release cooler, and the heat recovery heat exchanger are each connected to the intermediate storage element through respective parts of the recovery pipelines, and wherein a heat collection medium is provided within the intermediate storage element and the recovery pipelines, and is capable of flowing between the intermediate storage element and the evaporator, the condenser, the energy release cooler, and the heat recovery heat exchanger through the recovery pipelines, so that heat released from the condenser, the energy release cooler, and the heat recovery heat exchanger are provided to the evaporator for the evaporation of the carbon dioxide through the intermediate storage element via the heat collection medium;

wherein, the energy storage assembly and the energy release assembly are configured as capable of being turned on or off independent from each other, such that when both the energy storage assembly and the energy release assembly are turned on, an energy storage process in which the energy storage assembly operates and an energy release process in which the energy release assembly operates are performed simultaneously;

wherein a first flowing path allowing the carbon dioxide to flow from the gas storage reservoir to the liquid storage tank therewithin and a second flowing path allowing the carbon dioxide to flow from the liquid storage tank to the gas storage reservoir therewithin are formed between the gas storage reservoir and the liquid storage tank respectively; the first flowing path passes through the at least two compression energy storage parts and the condenser, but do not pass through the evaporator and the energy release cooler; and the second flowing path passes through the evaporator, the at least one expansion energy release part, and the energy release cooler, but do not pass through the condenser.

2. The multistage-compression energy storage apparatus according to claim 1, wherein the energy release assembly further comprises a throttle expansion valve, the throttle expansion valve is located between the liquid storage tank and the evaporator, and the throttle expansion valve is configured to depressurize the carbon dioxide flowing out of the liquid storage tank.

3. The multistage-compression energy storage apparatus according to claim 2, wherein when the energy storage process and the energy release process are performed simultaneously, the evaporator and the condenser are combined to form a phase change heat exchanger.

4. The multistage-compression energy storage apparatus according to claim 1, wherein each energy storage heat exchanger is connected to the compressor in each of the compression energy storage parts, each energy storage heat exchanger in each of the compression energy storage parts is connected to the compressor in an adjacent compression energy storage part, the compressor in the compression energy storage part at the starting end is connected to the gas storage reservoir, the energy storage heat exchanger in the compression energy storage part at the tail end is connected to the condenser, and the liquid storage tank is connected to the condenser.

5. The multistage-compression energy storage apparatus according to claim 1, wherein the expander is connected to the energy release heat exchanger in each of the expansion energy release parts, the expander in each of the expansion energy release parts is connected to the energy release heat exchanger in an adjacent expansion energy release part, the evaporator is connected to the liquid storage tank, the energy release heat exchanger in the expansion energy release part at the starting end is connected to the evaporator, the expander in the expansion energy release part at the tail end is connected to the energy release cooler, and the gas storage reservoir is connected to the energy release cooler.

6. The multistage-compression energy storage apparatus according to claim 1, wherein an auxiliary heating element is arranged between the cold storage tank and the heat storage tank, and part of the heat exchange medium is capable of flowing into the heat storage tank after being heated by the auxiliary heating element.

7. The multistage-compression energy storage apparatus according to claim 1, further comprising an external heat source, wherein the external heat source is connected to the evaporator.

8. The multistage-compression energy storage apparatus according to claim 1, wherein the intermediate storage element is a pool and the heat collection medium is water.

9. The multistage-compression energy storage apparatus according to claim 8, wherein a first recovery pipeline and a second recovery pipeline are arranged between the pool and the energy release cooler, a third recovery pipeline and a fourth recovery pipeline are arranged between the pool and the evaporator, a fifth recovery pipeline and a sixth recovery pipeline are arranged between the pool and the condenser, and a seventh recovery pipeline and an eighth recovery pipeline are arranged between the pool and the first heat recovery heat exchanger.

10. The multistage-compression energy storage apparatus according to claim 1, wherein the gas storage reservoir is a flexible pneumatic membrane gas storage reservoir.

11. A multistage-compression energy storage method using the multistage-compression energy storage apparatus of claim 1, the multistage-compression energy storage method comprising:

performing both the energy storage process and the energy release process simultaneously, wherein in the energy storage process, carbon dioxide is compressed for multiple times, the carbon dioxide is condensed into a liquid state, and part of energy generated when the carbon dioxide is compressed is temporarily stored by a heat exchange medium;

in the energy release process, after the carbon dioxide is evaporated into a gas state, the energy temporarily stored in the heat exchange medium is released through the carbon dioxide, and the carbon dioxide is cooled after energy release is complete; and the part of the energy stored in the heat exchange medium, energy generated during the condensation, and energy generated during cooling of the carbon dioxide after energy release is completed, are all used in evaporation of the carbon dioxide.

12. The multistage-compression energy storage apparatus based on carbon dioxide gas-liquid phase change according to claim 1, wherein the energy storage assembly and the energy release assembly are configured as capable of being turned on or off independent from each other, such that the multistage-compression energy storage apparatus can switch between a first operating state, a second operating state, and a third operating state, wherein in the first operating state, the energy storage assembly is turned on and the energy release assembly is turned off, so that an energy storage process in which the energy storage assembly operates is performed while an energy release process in which the energy release assembly operates is not performed;

in the second operating state, the energy storage assembly is turned off and the energy release assembly is turned on, so that the energy storage process is not performed while the energy release process is performed; and in the third operating state, both the energy storage assembly and the energy release assembly are turned on, so that an energy storage process in which the energy storage assembly operates and an energy release process in which the energy release assembly operates are performed simultaneously.

13. The multistage-compression energy storage apparatus based on carbon dioxide gas-liquid phase change according to claim 1, wherein, when the heat exchange medium flows from the cold storage tank through the energy storage heat exchanger to the heat storage tank, the heat exchange medium absorbs heat generated during an energy storage process.

14. A multistage-compression energy storage apparatus based on carbon dioxide gas-liquid phase change, the multistage-compression energy storage apparatus comprising:

a gas storage reservoir, configured to store carbon dioxide in a gas state, wherein a volume of the gas storage reservoir is changeable;

a liquid storage tank, configured to store carbon dioxide in a liquid state;

an energy storage assembly, configured to store energy and arranged between the gas storage reservoir and the liquid storage tank, wherein the energy storage assembly comprises a condenser and at least two compression energy storage parts, the compression energy storage parts each comprise a compressor and an energy storage heat exchanger, each compressor is configured to compress the carbon dioxide, and the condenser is configured to condense the carbon dioxide;

an energy release assembly, arranged between the gas storage reservoir and the liquid storage tank, wherein the energy release assembly comprises an evaporator, an energy release cooler, and at least one expansion energy release part, each of the at least one expansion energy release part comprises an expander and an energy release heat exchanger, the evaporator is configured to evaporate the carbon dioxide, each expander is configured to release energy, and the energy release cooler is configured to cool the carbon dioxide entering the gas storage reservoir; and a heat exchange assembly, wherein the heat exchange assembly comprises a cold storage tank, a heat storage tank, and a heat recovery heat exchanger arranged between the energy release heat exchanger and the cold storage tank, a heat exchange medium is provided in the cold storage tank and the heat storage tank, the cold storage tank and the heat storage tank form a heat exchange circuit between the energy storage heat exchanger in each of the compression energy storage parts and the energy release heat exchanger in each of the at least one expansion energy release part, the heat exchange medium is capable of flowing in the heat exchange circuit, when the heat exchange medium flows from the heat storage tank through the energy release heat exchanger to the cold storage tank, part of energy absorbed by the heat exchange medium is released into the carbon dioxide flowing through the energy release heat exchanger, and part of the energy flows to the heat recovery heat exchanger;

wherein at least one of the condenser, the energy release cooler, or the heat recovery heat exchanger is connected to the evaporator to provide energy to the evaporator;

wherein, the energy storage assembly and the energy release assembly are configured as capable of being turned on or off independent from each other, such that when both the energy storage assembly and the energy release assembly are turned on, an energy storage process in which the energy storage assembly operates and an energy release process in which the energy release assembly operates are performed simultaneously;

wherein a first flowing path allowing the carbon dioxide to flow from the gas storage reservoir to the liquid storage tank therewithin and a second flowing path allowing the carbon dioxide to flow from the liquid storage tank to the gas storage reservoir therewithin are formed between the gas storage reservoir and the liquid storage tank respectively; the first flowing path passes through the at least two compression energy storage parts and the condenser, but do not pass through the evaporator; and the second flowing path passes through the evaporator, the at least one expansion energy release part, and the energy release cooler, but do not pass through the condenser;

wherein the energy release assembly further comprises a throttle expansion valve, the throttle expansion valve is located in the second flowing path between the liquid storage tank and the evaporator, and the throttle expansion valve is configured to depressurize the carbon dioxide flowing out of the liquid storage tank; when the throttle expansion valve is turned on, and the energy storage process and the energy release process are performed simultaneously, the evaporator and the condenser are combined to form a phase change heat exchanger.

15. The multistage-compression energy storage apparatus based on carbon dioxide gas-liquid phase change according to claim 14, wherein the condenser, the energy release cooler, and the heat recovery heat exchanger are all connected to the evaporator.

16. The multistage-compression energy storage apparatus based on carbon dioxide gas-liquid phase change according to claim 14, wherein the second flowing path comprises a first energy release pipeline and an eighth energy release pipeline arranged in parallel between the evaporator and the liquid storage tank, the first energy release pipeline is provided with no throttle expansion valve, and the eighth energy release pipeline is provided with a throttle expansion valve, during the energy release process, one of the first energy release pipeline and the eighth energy release pipeline is chosen to be passable.

* * * * *